(12) United States Patent
Butler et al.

(10) Patent No.: US 11,507,866 B1
(45) Date of Patent: Nov. 22, 2022

(54) PREDICTING RESULTS FOR A VIDEO POSTED TO A SOCIAL MEDIA INFLUENCER CHANNEL

(71) Applicant: BRANDED ENTERTAINMENT NETWORK, INC., Sherman Oaks, CA (US)

(72) Inventors: Richard Ray Butler, Van Nuys, CA (US); Estelle Evonne Cramer, Malibu, CA (US); Tyler Folkman, Lehi, UT (US); Jacob Bradshaw Maughan, Spanish Fork, UT (US); Alexander Charles McFadyen, London (GB); Theodore Sheffield, Encino, CA (US)

(73) Assignee: BRANDED ENTERTAINMENT NETWORK, INC., Sherman Oaks, CA (US)

( * ) Notice: Subject to any disclaimer, the term of this patent is extended or adjusted under 35 U.S.C. 154(b) by 539 days.

(21) Appl. No.: 16/697,734

(22) Filed: Nov. 27, 2019

Related U.S. Application Data

(60) Provisional application No. 62/840,958, filed on Apr. 30, 2019.

(51) Int. Cl.
*G06N 3/08* (2006.01)
*G06N 5/04* (2006.01)
*G06F 16/78* (2019.01)
*G06N 20/20* (2019.01)
*G06Q 50/00* (2012.01)

(52) U.S. Cl.
CPC ............. *G06N 5/046* (2013.01); *G06F 16/78* (2019.01); *G06N 3/08* (2013.01); *G06N 20/20* (2019.01); *G06Q 50/01* (2013.01)

(58) Field of Classification Search
CPC .......... G06N 5/046; G06N 3/08; G06N 20/20; G06F 16/78; G06Q 50/01
USPC ......................................................... 706/21
See application file for complete search history.

(56) References Cited

U.S. PATENT DOCUMENTS

2021/0097240 A1* 4/2021 Singh ...................... G06F 40/35

* cited by examiner

*Primary Examiner* — Charlotte M Baker
(74) *Attorney, Agent, or Firm* — Soquel Group LLC

(57) ABSTRACT

This invention predicts results for a media clip posted to a social media influencer channel by maintaining a database of results data for media clips where an influencer channel includes media clips that include unstructured data, and structured data, and then provide to a first machine learning model a first set of channel data, extracting a first set of features, predicting a value for the first target variable, providing to a second machine learning model a second set of channel data including a second selection of structured data, and the predicted value of the first target variable, extracting a second set of features, and predicting a value for the second target variable.

28 Claims, 11 Drawing Sheets

*Influencer Page 300*

FIG. 3

PREDICTING RESULTS FOR A VIDEO POSTED TO A SOCIAL MEDIA INFLUENCER CHANNEL

TECHNICAL FIELD

Various embodiments generally relate to a system for evaluating the effectiveness of social media influencer channels using predictive analytics and machine learning techniques.

BACKGROUND

Product placement refers to the placement of product and brand advertising integrated within media such as movies, television programs, social media, songs, Web photos and videos and the like such that the advertising is integrated within the media. Examples include an actor holding a specific beverage product in a movie where the beverage product's label is prominently featured, a social media influencer discussing or demonstrating a product in a video clip, an actor driving a specific type of car within a television program, a song that mentions a specific product, or a photo of a celebrity published on a Web page in which the celebrity is wearing a specific brand of clothing. Product placement is a form of advertising but is different from conventional advertising and is not addressed by traditional computer-based advertising systems, tools and platforms.

With the proliferation of social media influencers, i.e. individuals that promote brands and products on a paid basis through their social media channels, it would be advantageous to be able to automatically predict the results of an influencer channel in relation to a brand or product. As an example of such a prediction: if a brand selects an influencer channel and pays the influencer to include brand promotion in a video then what would be the resulting clicks on a promotional link in the video and what would be the resulting conversation rate, i.e. the rate at which viewers take an action or make a purchase as a result of viewing the video.

Techniques that exploit historical data to make predictions are often referred to as predictive analytics. A well-known application of predictive analytics is credit scoring which computes a score that assesses an individual's credit worthiness. Predictive analytics encompass a variety of techniques, typically categorized as statistical regression and machine learning. Such techniques typically rely on access to structured data, also referred to as metadata, in which the data is structured into fields with well-defined meanings.

In contrast, influencer data is in the form of both structured and unstructured data, where unstructured data, such as audio and video clips and digital images, is not segmented into fields.

The correlation or contribution by the structured data available on influencer channels to the success of the channel or to a particular media clip posted to the channel, such as the number of subscribers, average views per media clip, and engagement rates, and the success of an influencer channel can be evaluated using techniques specific to analyzing structured data such as regression techniques, and decision trees. However, the characteristics or features of the unstructured data that contribute to the success of an influencer channel are not well understood. Thus, machine learning techniques that extract features from unstructured data are suitable.

One class of techniques suitable for analyzing unstructured data are referred to as deep learning methods or models and are based on neural networks. Deep learning models are trained using large sets of data and once trained are capable of extracting or learning features directly from the data without the need for manual feature extraction. One specific type of neural network that is particularly suitable for use with video, audio and image data in referred to as a convolutional neural network.

Thus, to fully analyze influencer channel data it is desirable to use and combine the results from techniques suited for structured data and techniques suited for unstructured data.

Thus, it is with respect to these considerations and others that the present invention has been made.

SUMMARY OF THE DESCRIPTION

Various embodiments are directed towards a method and device that predicts the results of videos and other media posted to a social media channel. More specifically, machine learning (ML) techniques are used predict the results, typically views, clicks and conversions, for a video or other media item posted to an influencer channel.

In one embodiment, two or more successive rounds of machine learning are applied, each of which constructs a model that yields an estimate of a target variable. The target variables are hierarchically related. And each successive round of machine learning takes inputs from the previous round. Each model takes as input structured data and unstructured data and applies different machine learning techniques according to the type of data being analyzed.

Various embodiments predict results for a media clip posted to a social media influencer channel by maintaining a database of results data for media clips, where an influencer channel includes media clips that include unstructured data, and structured data, providing to a first machine learning model a first set of channel data, extracting a first set of features, predicting a value for the first target variable, providing to a second machine learning model a second set of channel data including a second selection of structured data, and the predicted value of the first target variable, extracting a second set of features, and predicting a value for the second target variable.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Preferred Embodiment, which is to be read in association with the accompanying drawings, wherein:

FIG. 2A illustrates one embodiment of a user interface that enables a buyer to specify a product placement media plan using personas.

FIG. 2C provides an embodiment of a buyer interface that enables a buyer to select personas, view characteristics of personas, create new personas and edit personas.

FIG. 3 shows an example influencer channel web page.

DETAILED DESCRIPTION

Figure 1:
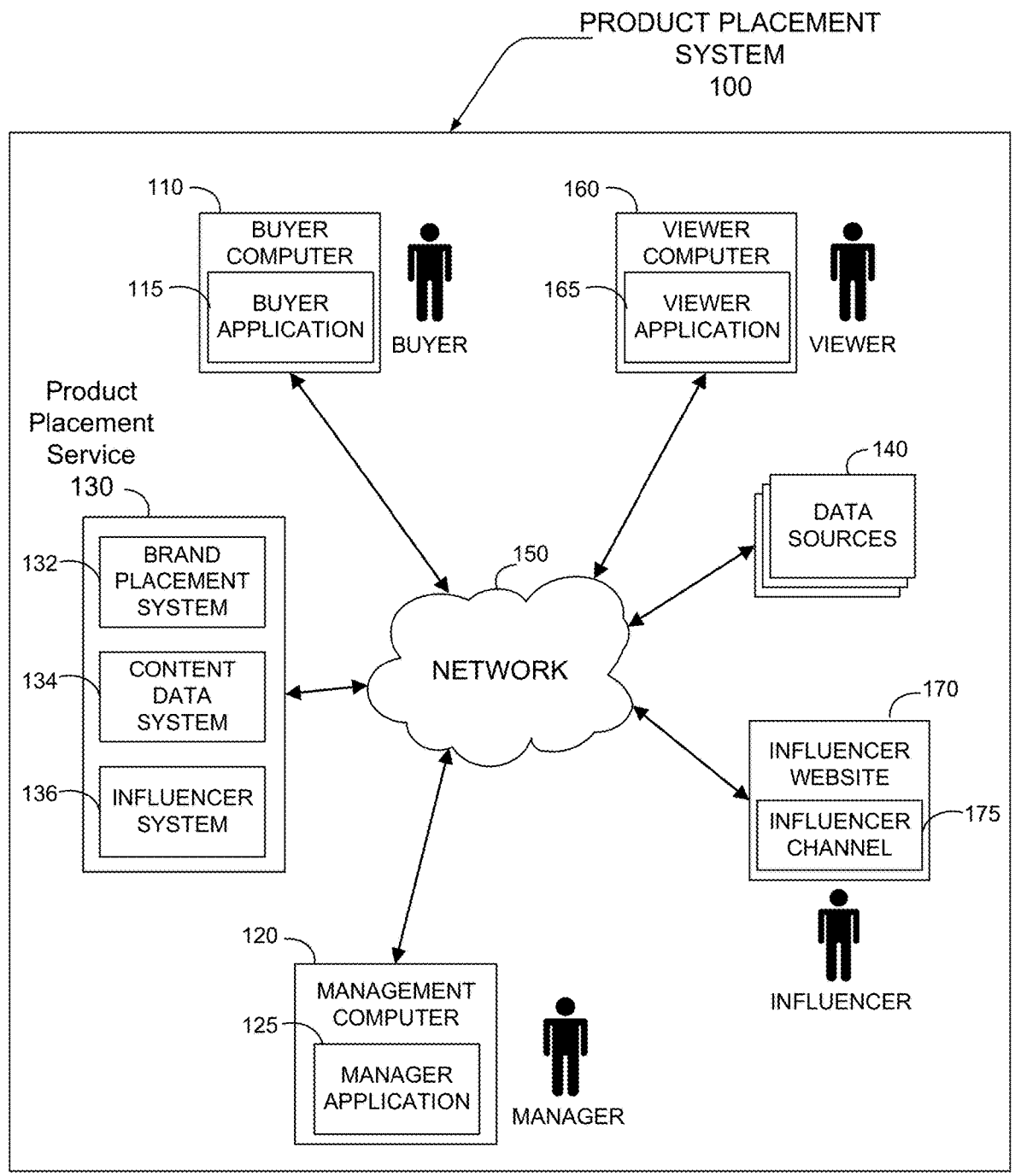
FIG. 1 is a generalized block diagram of a preferred embodiment of an online product placement system.

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods, processes, systems, business methods or devices. Accordingly, the present invention may take the form of an entirely hardware embodiment, an entirely software embodiment or an embodiment combining software and hardware aspects. The following detailed description is, therefore, not to be taken in a limiting sense.

As used herein the following terms have the meanings given below:

Impression—refers to a viewing or listening of a piece of media such as a movie, television program, social media, Web video, song, or photo by one person.

CPM—refers to a standard cost metric that means the price charged by a publisher for a conventional advertisement or placement in a piece of media for one thousand impressions or views.

Channel—as used herein refers to a category of media in which a product placement can be made. Channels include television, movies, music, social media, printed advertisements, Web video advertisement, Web image advertisements, and the like.

Influencer channel—A social media channel that is typically devoted to media from a specific individual, referred to as an influencer.

Media Vehicle or vehicle—refers to a specific piece of media such as a video, television program, film or movie, social media network such as FACEBOOK, INSTAGRAM or YOUTUBE, influencer, influencer channel, web advertisement, video, song or other piece or collection of media in which a product placement may be made.

Media buyer or buyer—means an individual that uses a mobile device, PC or other electronic device to access and use a product placement service available across a network, typically with the objective of specifying a media plan, purchasing placements, or evaluating results from implementation of a media plan by the placement service.

Product placement or placement—means the integration of a display, appearance, or mention of a product or brand within a vehicle. The media may be audio or visual, or both, such as within a music video. A placement is different than a conventional advertisement in that it is integrated with the media content, i.e. there is continuity between the media content of the vehicle and the placement. Thus, the storyline of the vehicle is not disrupted and the viewer does not perceive a placement as a separate advertisement. The term product placement refers to advertisements for specific products as well as to more general advertisements for brands, e.g. when a company logo might appear rather than a specific product. Examples of placements include an actor in a movie driving a specific model of car during a chase scene, an actor holding a specific, easily recognizable beverage, in a movie, film, or photo, or a mention of a specific product in a song.

Product placement opportunity, or opportunity—means a potential placement in a vehicle that may be purchased by a media buyer.

Influencer marketing (also influence marketing) is a form of marketing in which an individual, referred to as an influencer or social media influencer or social influencer, communicates brand information and advertising to their social media followers.

Viewer, follower, subscriber—refers to an individual who views one or more influencer channels. The individual may be a subscriber or follower of the influencer channels.

Influencer or social media influencer—refers to an individual provides information to followers via an influencer channel. An influencer typically produces, directs or appears in media clips or segments that are published on Web-based media such as websites or blogs or on social media networks such as FACEBOOK, INSTAGRAM and YOUTUBE. These Web-based media are generally referred to herein as influencer channels. In certain cases, influencers can be paid to focus on specific products or brands or to include brand advertising in the form of product placements in their media clips or other published material.

Influencer power—refers to a score or rating of the potential success for a branded product placement in an influencer's media clips or other publications.

Machine learning model—refers to an algorithm or collection of algorithms that takes structured and/or unstructured data inputs and generates a prediction or result. The prediction is typically a value or set of values. A machine learning model may itself include one or more component models that interact to yield a result. As used herein, a machine learning model represents both machine learning processing and the model that is created through successive executions of the model. Typically, a model is executed successively during a training phase and after is has been successfully trained, is used operationally to evaluate new data and make predictions. It must be emphasized that the training phase may be executed 1000s of times in order to obtain an acceptable model capable of predicting success metrics. Further, the model may discover 1000s or even 10s of thousands of features. And many of these features may be quite different than the features provided as input data. Thus, the model is not known in advance and the calculations cannot be made through mental effort alone.

Target variable, target data, or target—a data element in a dataset for which a prediction or deeper understanding is desired.

GENERALIZED OPERATION

The operation of certain aspects of the invention is described below with respect to FIGS. 1-8.

FIG. 1 is a generalized block diagram of a preferred embodiment of an online product placement system 100 in which a product placement service enables a media buyer to specify a media plan, and then searches for product placement opportunities that conform to the media plan. Product placement system 100 further enables managers to predict the success of influencer channels for potential inclusion in media plans. A media buyer, hereinafter referred to simply as a buyer, uses a buyer application 115 that runs in a buyer computer 110 to perform some or all of the following functions: specify, define, edit or modify a media plan, specify filters, and view summary and detailed results from execution of a media plan. Buyer application 110 is described in further detail hereinbelow with reference to FIGS. 2A-C. Buyer application 115 may include one or more Web browser-based applications and/or mobile apps delivered across a network from a product placement service 130 and executed by buyer computer 110, one or more mobile applications, or it may be one more applications that are separately downloaded or installed from other media such as a USB drive or other external storage medium, into buyer computer 110 for execution by a buyer.

Product placement service 130 refers to a service that is available across a network 150 that enables a buyer to specify and implement a media plan across multiple types of media and to evaluate influencer channels. Product placement service 130 may be implemented by one or more server computers acting cooperatively or by a network service, or "cloud" service provided by a third party. One embodiment of a server-based approach to implementing product placement service 130 is described hereinbelow with reference to FIGS. 8 and 9. Placement service 130 provides services across network 150 to a buyer computer 110 and to a management computer 120.

A manager of placement service 130 ensures that placement opportunities are available to a buyer using buyer application 115 running on buyer computer 110. A manager further uses buyer application 115 to evaluate influencer channels. A manager uses a management application 125 that runs in management computer 120 to interact with management functions provided by product placement service 130. Management functions may include defining or providing data for vehicles, opportunities and placements, and maintaining a database of buyers with up-to-date buyer information. Manager application 123 and buyer application 115 may be implemented as a single application that presents various user interfaces depending on the role, rights and authorization of a particular user.

Product placement service 130 maintains a database of product placement opportunities, also referred to herein simply as opportunities. Each opportunity refers to a potential product placement within a vehicle such as a television program, social media network, social media influencer, song or movie. Once an opportunity is included in a media plan and executed as part of a placement campaign it is referred to as a product placement or simply as a placement.

Product placement service 130 includes a content data system (CDS) 132, which is a data system that includes a data warehouse that receives and stores information about vehicles, opportunities, audience data, and social media engagement from various external data sources 140. CDS 132 receives and stores external data from data sources 140 and processes the data to generate opportunity objects, or opportunities. The opportunities are then compared to target audiences defined by a buyer in order to determine audience scores, and to social engagement data to determine engagement scores for each opportunity.

Product placement service 130 also includes a brand placement system 132 that performs a variety of user requested processes such as creating a media plan, selecting opportunities for inclusion in a media plan, searching for and reviewing vehicles and opportunities, and defining target audiences.

Product placement service 130 further includes an influencer system 136 that gathers data from one or more influencer channels 175 that operate on influencer websites 170 and analyzes the data to predict the success of the influencer channels 175 if included in a media plan.

A viewer visits influencer channel 175 to view media clips published by the influencer. The viewer may subscribe to or follow influencer channel 175 or may be an infrequent viewer that does not subscribe or follow influencer channel 175. A viewer uses a viewer application 165 running in a viewer computer 160 to interact with influencer channel 175.

Influencer system 136 obtains data from influencer channel 175, as discussed hereinbelow with reference to FIG. 5 for analysis.

Data sources 140 may be publicly available databases or services or private information services. Table 1 below, gives an example of data that may be obtained from data sources 140 for different channels. This information is available from a variety of companies and organizations including, for example, THE NIELSEN COMPANY, COMSCORE, and GOOGLE.

TABLE 1

Example external data sources

| Channel | Type of Data Available From External Data Sources |
|---|---|
| Film (movie) | Number of impressions per geographic territory; demographics of audiences. |
| Television (broadcast, streaming, video on demand) | Impression counts; demographic profiles for impressions. |
| Digital (video accessed across the Internet, includes video ads in Web pages as well as video shows) | Impression counts and demographics of viewers. |
| Music Video | Impressions and demographics of viewers. |
| Celebrity Image for Print Media | Publication in which celebrity seeded images are published; average circulation of each publication and demographic profile of viewers. |
| Celebrity Images for Web Media | List of URLs that identify Web pages that publish seeded celebrity images; impressions and demographics of viewers. |
| Social Media Network | Social media audience profile and engagement data. |
| Social Media Influencer Channel | Media clips such as videos and audios; meta data for the clips such as date posted, length, views; profile information for the influencer and the influencer channel; engagement data such as comments, likes, etc. |

Figure 2A:
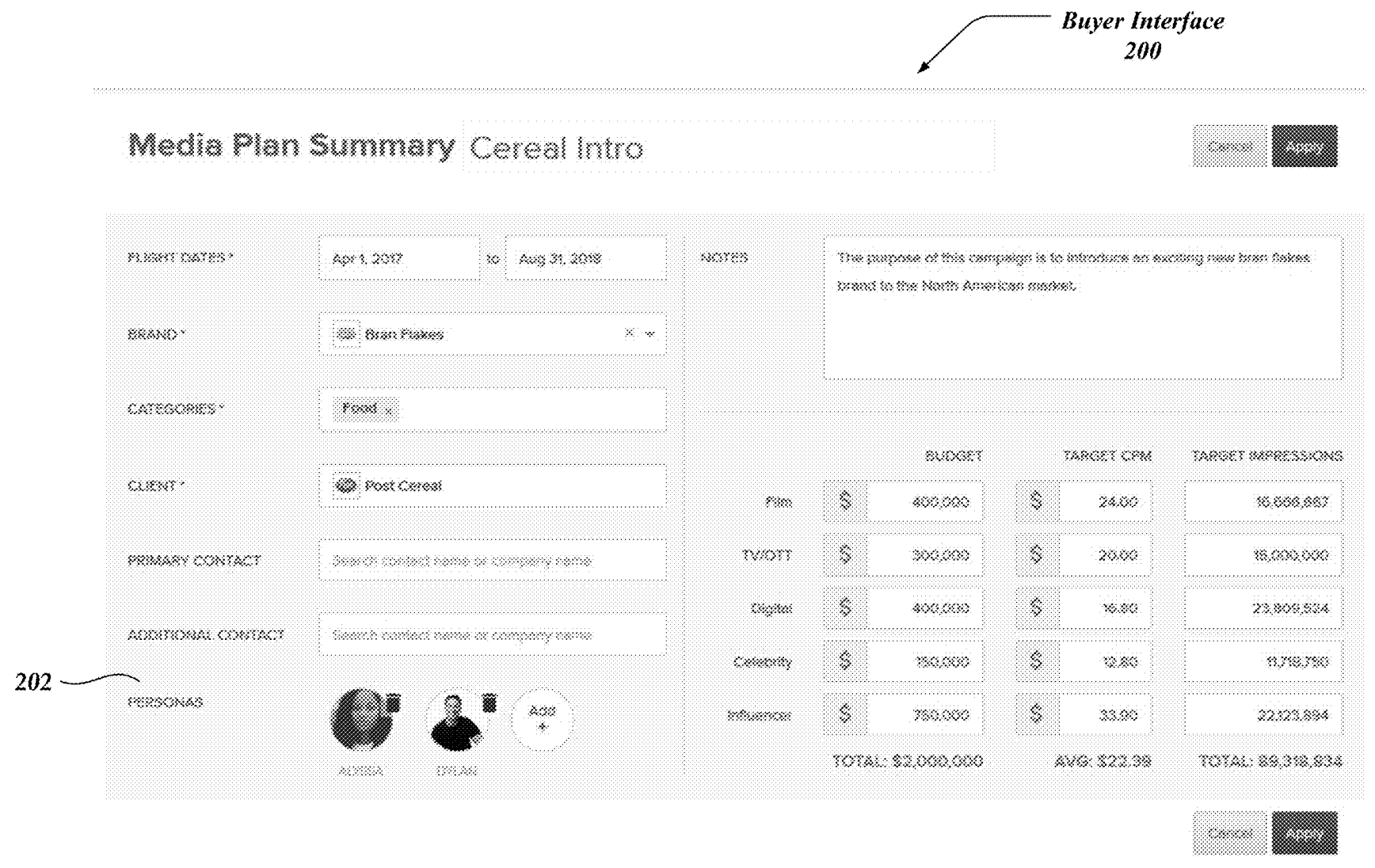
Figure 2B:
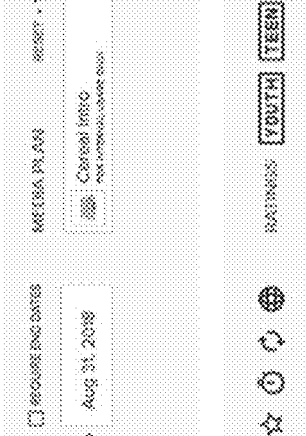
FIG. 2B illustrates an embodiment of a search interface for a buyer interface.
Figure 2C:
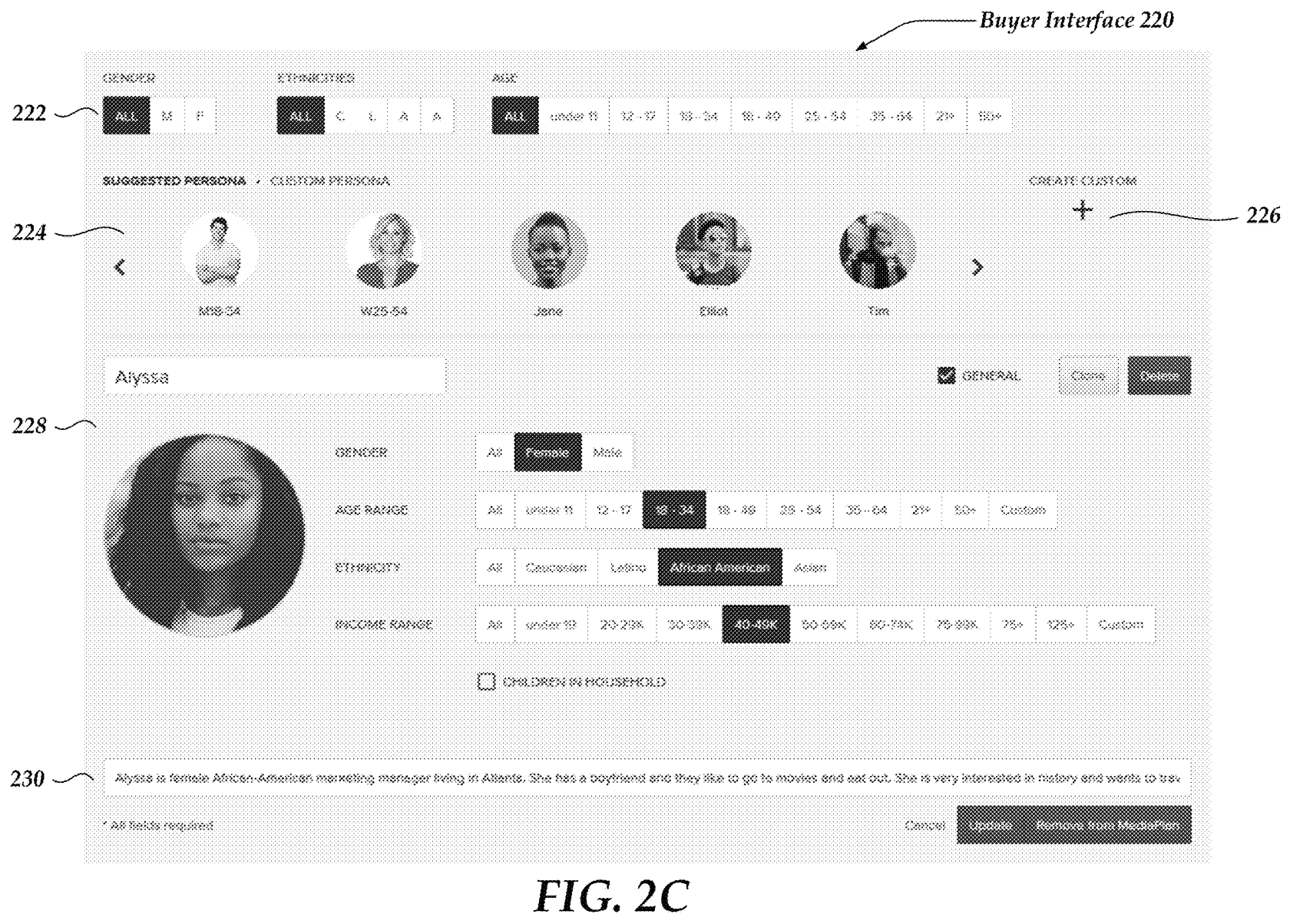

FIGS. 2A-C are embodiments of a user interface implemented by buyer application 115. In one embodiment, each of FIGS. 2A-2C correspond to an interactive Web page that is provided by placement service 130 to buyer computer 110 to be displayed by buyer application 115.

Persona Based Matching

As illustrated in FIG. 2A, specifying one or more target audiences that are used for matching opportunities to a media plan is key step in media planning. A visual approach to specifying a target audience, referred to as persona based matching (PBM), is described hereinbelow that more directly utilizes information provided by brands concerning the target audiences for their advertising and product placement campaigns. In some cases, this information concerning target audiences is supplied by a brand in a document, commonly referred to as a brand brief. In other cases, the information is communicated through less formal means, such as through conversations, memos, and the like.

Typically, a brand specifies a target audience as a series of personas, which are named, fictitious, individuals each of which represents a specific audience. The union of the specific audiences is referred to as the brand audience or target audience. The target audience is defined by a set of characteristics, which may typically include demographic details such as age, gender, ethnicity, and psychographic details such as personality traits, values, attitudes, interests, and lifestyles or behaviors that typify the desired audience for the brand. Thus, the term persona as used herein refers to a visual representation of a fictitious individual that represents a specific, target, audience. As such, a persona represents or specifies the characteristics of a desired audience which may include demographic, psychographic and behavioral characteristics. The ability to refer to, select and manipulate audience characteristics using visual personas is a novel and unique characteristic of certain embodiments of system 100.

In the subject invention, data is provided by brands to product placement service 130 by a buyer or by staff.

FIGS. 2A-C present an embodiment of buyer application 115 that enables a buyer to specify a target audience using a visual, persona-based approach.

FIG. 2A illustrates how personas are used in a media planning interface 300 to define a target audience. The term target audience is used because the personas represent the audience that a brand, or buyer representing a brand, wants to reach through a product placement campaign. The brand audience and media plan specified using buyer interface 200 applies to a single campaign. The term "brand persona" may also be used to reflect the combination of one or more personas to represent the target audience.

Buyer interface 200 enables the buyer specifies a target audience for a campaign using personas. The buyer uses a target audience control 202 to select personas for inclusion in the target audience. As illustrated, the buyer has selected two personas, named Alyssa and Dylan, which in combination specify a brand persona, or target audience, for the campaign. In certain embodiments, a buyer can adjust the percentage contribution, or relative weight, of each persona. For example, a slider, or other control, may be available that lets the buyer adjust the contribution of a persona upward or downward. Additionally, in certain embodiments, it is possible to adjust the weight or importance of certain attributes of a persona.

FIG. 2B illustrates an embodiment of a search interface for a buyer interface 210. In certain embodiments, brand placement system 132 initiates an opportunity search after a buyer creates a media plan using buyer interface 200. An opportunity search searches for available opportunities that match the brand persona created using buyer interface 200. A summary panel 212 summarizes data from the media plan, including personas, categories, flight date and name. An opportunity summary panel 214 provides data that summarizes the opportunities determined by the opportunity search. In the example, 143 films, 398 TV shows, 21 Web ads, 232 celebrity endorsers and 1033 social media influencers were returned. The buyer can filter the opportunities based on ratings and other criteria. A search box 216 enables a buyer to enter search criteria including opportunity name, cast member, network or keywords. Additionally, the search can be sorted according to various criteria, including a Fit score, an audience score, an engagement score, and media type. In this example, results are displayed as image thumbnails 218 with a thumbs up icon, a name, and an indicator of the type of media. Clicking on the thumbs up icon indicates that the buyer wants to consider the opportunity for inclusion in the media plan. Although not depicted in this example, results are returned along with one or more scores. Scores may include an engagement score, an audience score and a Fit score, which are discussed hereinbelow. In certain embodiments, one or more of the scores is used to order the search results. Further, in certain embodiments one or more of the scores may be displayed to the buyer.

FIG. 2C provides an embodiment of a buyer interface 220 that enables a buyer to select personas, view characteristics of personas, create new personas and edit personas. A persona filter panel 224 lets the buyer specify filters to apply when presenting or searching for available personas. Photos that represent personas that meet the characteristics defined in the persona filter panel 224 appear in a persona carousel 224.

A create custom control 226 allows a buyer to indicate that he/she wants to define a new or custom persona. In certain embodiments, a clone persona is used as the basis for creating a new persona and a clone persona inherits the characteristics of the currently selected persona. After a clone person is created the buyer uses a persona detail interface 240 to edit the characteristics of the clone persona.

A characteristics panel 228 shows a representative image 230 and enables a buyer to specify the characteristics of a persona, such as a name, gender, age range, ethnicity, income range and whether there are children in the household. In this example, characteristics for persona, referred to as Alyssa, which has already been included in a media plan are displayed. A textual description 232 provides a summary of the persona. In certain embodiments, selecting image 230 opens a buyer interface 240 that shows and enables the buyer to edit additional characteristics of the selected persona. It may be appreciated that characteristics panel 228 provides demographic details; however, generally a persona may include a wide variety of characteristics including demographic, psychographic, behavioral and social.

Predicting the Effectiveness of Influencer Channels

An influencer or social media influencer typically has a channel, referred to herein as a channel or influencer channel, on one or more social media networks such as YOUTUBE, INSTAGRAM, FACEBOOK. The influencer channel includes media such as videos, images, audios, music and text aimed at a specific market segment of viewers or followers. Users or subscribers can subscribe to or follow an influencer channel. Because an influencer channel typically repeatedly addresses the same market segment, typically by posting successive media clips that target the market segment, it is possible to measure the impact that an influencer channel has on its followers. Thus, it is possible to define a rating, referred to herein as influencer power, of the potential impact on purchasing of an influencer channel. In certain embodiments, influencer power is independent of the particular products or brands being marketed. However, an influencer channel is likely to be more appropriate for certain types of products than for others, and for certain demographic segments than others.

Ratings of the effectiveness of an influencer channel, i.e. influencer power, are based on metrics such as views, clicks, conversions, and engagement. For example, one measure of influencer power for an influencer channel is the average views per conversion (VPC), i.e. the number of views of a media clip that results in a single conversion. Here, conversion refers to a desired action being taken by a subscriber or viewer of a media clip in response to an offer or promotion integrated into the clip. A typical action might be clicking on a link displayed in or adjacent to the clip and then purchasing a promoted product such as a pair of shoes or an automobile or electronic game. Further, influencer power may be measured by category, for categories such as product type, brand, demographic segment and the like.

FIG. 3 shows an example influencer channel web page. This influencer channel is directed towards teenage girls and focuses on beauty products. It is typical of influencer channels on the YOUTUBE social network. A profile 302 lists the name of the influencer, displays a photo and gives the number of subscribers, or followers, of the channel. A menu 304 provides access to features including a list of videos by the influencer, playlists, channels related to or recommended by the influencer, about which provides additional information about the influencer. A featured video 306 includes a thumbnail and a description of a recent or popular video. A number of video thumbnails 308 together with their titles enables the follower to select a video for viewing. Additional information may be given for each video such as the number of views and when the video was posted. Finally, a list of related influencer channels 310 is provided.

In general, an influencer channel, as defined by a collection of web pages, or social media network app, offers influencer channel data such as that described in Table 2, below.

TABLE 2

| Influencer Channel Data | |
|---|---|
| Type of Data | Description |
| Channel nnetadata | Information about the channel itself, including information about the influencer, the number of subscribers or followers, average number of views for a media item, channel category, the number of videos, etc. |
| Related nnetadata | Influencer channels on leading social networks such as YOUTUBE, INSTAGRAM, FACEBOOK enable an influencer to post media clips including videos and enable viewers to post comments in relation to the media clips. Related data is information about posted media clips, such as description, duration, date posted. Also may include engagement data such as the number of views (impressions), clicks, conversions, likes, comments, date of the likes and comments. |

TABLE 2-continued

| Influencer Channel Data | |
|---|---|
| Type of Data | Description |
| Unstructured data | The posted media clips, including videos, audios and images, as well as engagement data such as text comments. |
| Derived metadata | Information that is derived from the channel metadata and the related metadata, such as the frequency of posts, average number of likes, comments per view, etc. |

Placement service 130 collects information about the results of previous campaigns, i.e. the results from videos posted to an influencer channel. This may be accomplished by an agreement with the owner of a linked website to collect conversion or purchase data from viewers of the influencer channel that visit the linked website. Such results are collected by placement service 130 and stored in a results database in content data system 134, such as in a results database 948 described hereinbelow with reference to FIG. 9. This historical results data is subsequently available for computing metrics for an influencer channel.

Results data collected for channel videos may include information such as that described in Table 3 hereinbelow.

TABLE 3

| Results Data | |
|---|---|
| Type of Data | Description |
| Views | Total number of views for an individual videos. From this metrics such as the average number views per video may be computed. |
| Clicks | Total number of instances when a viewer clicks on an offer corresponding to a video. From this metrics such as the click through rate may be computed. |
| Engagement | The amount of engagement per video, e.g. the number of comments, likes, user ratings. |
| Conversions | Total number of times when a viewer clicks on offer corresponding to a video and then purchases a corresponding product or service. |
| Views per conversion (VPC) | The ratio of views to conversions. |

FIGS. 4-6, and 8-9 are flow and component diagrams in which each graphical element, including rectangles, cylinders, and triangles, can be implemented by computer program instructions. These program instructions may be provided to a processor and then executed by the processor, thus creating means for implementing the actions represented by the graphical element. The computer program instructions may be executed by a processor to cause a series of operational steps to be performed by the processor to produce a computer-implemented process such that the instructions, which execute on the processor to provide steps for implementing the actions represented by the graphical element. Some of the computer program instructions may be performed in parallel, or across more than one processor, such as might arise in a multi-processor computer system. In addition, the actions represented by one or more graphical elements may also be performed concurrently with actions represented by other graphical elements, or even in a different sequence than illustrated without departing from the scope or spirit of the invention. It will also be understood that the actions represented by each graphical element and by combinations of graphical elements can be implemented by special purpose hardware-based systems that perform the specified actions or steps, or combinations of special purpose hardware and computer instructions.

Figure 4A:
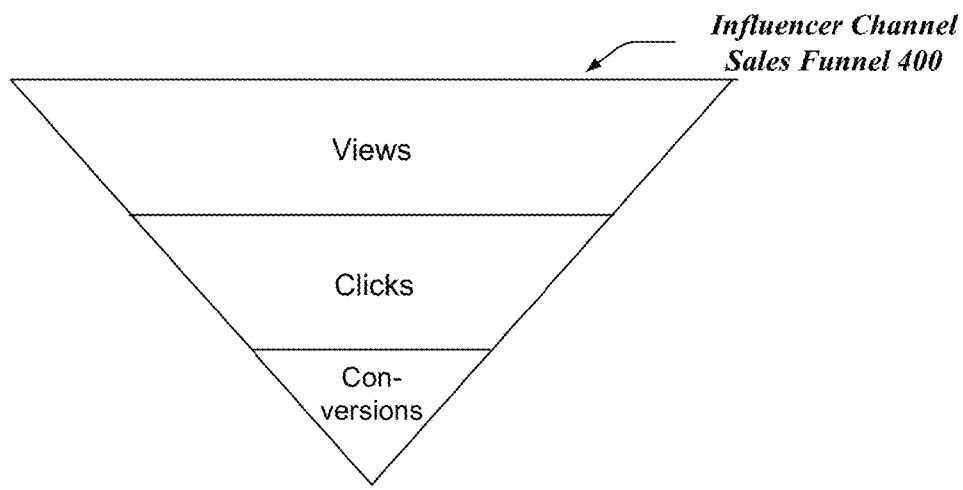
FIG. 4A illustrates a sales funnel model for an influencer channel.

FIG. 4A illustrates a sales funnel model 400 for an influencer channel. At the first level, a number of subscribers view a media item, such as a video clip, on an influencer channel. A fraction of those subscribers will click on the video or media item in order to view an offer that is provided as part of the media item, the second level. A fraction of those that click will then purchase a product or service that corresponds to the offer, which is referred to as a conversion. Thus, for a seller that sponsors a video or purchases a placement in a video, the number of views, clicks and conversions are fundamental metrics of the success of the video. Other metrics such as click through rate (CTR) and views per conversion (VPC) may also be computed. It would therefore be desirable to be able to predict the number of views, clicks and conversions a video will generate.

Figure 4B:
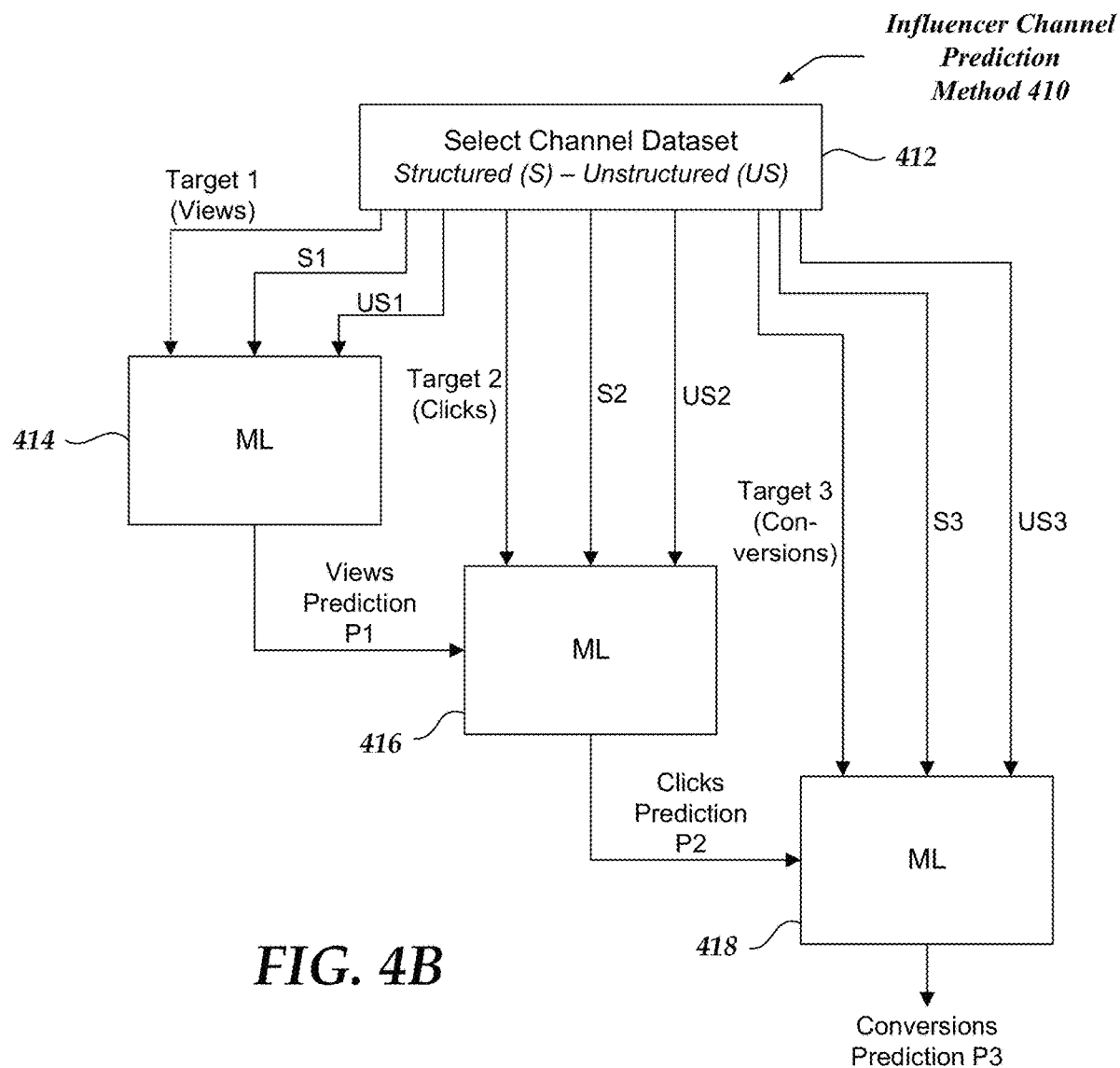
FIG. 4B illustrates a method using machine learning (ML) to predict the results for a video or other media item posted to an influencer channel.

FIG. 4B illustrates a method 410 using machine learning (ML) to predict the results, typically views, clicks and conversions, for a video or other media item posted to an influencer channel. Henceforth, when the term video is used alone it is with the understanding that unless otherwise stated the action, step, decision or process being described may also be applied to other types of media including inter alia images, recorded music and speech, and text. At step 412, a channel dataset is selected from all the available data from an influencer channel, which includes structured and unstructured data, is provided to a sequence of machine learning steps (414, 416, 418). The unstructured data are typically media clips such as videos, audios, and images. Unstructured data may also include notes, comments, documents and other text provided by subscribers. The structured data is maintained as a set of values, where the values are commonly referred to as features. As described in Tables 2-3, structured data includes channel metadata, related metadata, derived metadata and results data. Structured data is selected for inclusion in the channel dataset at step 412 based on its potential relevance to the process of predicting results.

Three layered or stacked rounds of machine learning are then applied at steps 414, 416 and 418. Each step uses one or more machine learning techniques to construct a model which yields an estimate of a target variable. The target variable at each step, respectively views, clicks and conversions, is a feature of a dataset provided as input to the model. The machine learning algorithm enables the model to uncover patterns and relationships between the target variable and other features of the dataset. The dataset is typically historical data collected from an influencer channel being evaluated. Thus, in method 410, the target variables of machine learning steps 414, 416 and 418 are views, clicks, and conversions, respectively.

Due to the nature of the channel data provided at step 412 and also due to the strengths and weaknesses of various machine learning algorithms, each of machine learning steps 414, 416 and 418 includes a set of machine learning steps that first train a model and then use the model operationally to predict results, as described hereinbelow with reference to FIG. 5.

At step 414 a channel dataset that includes structured data S1, unstructured data US1 is processed to yield a machine learning model that predicts views, the target variable. One of the features provided among the structured data S1 is historical views data, referred to as Target 1. This may be, for example, the average number of views per video on the influencer channel or the number of views from a specific video. The result of step 414 processing is a model ML 414 and an estimate or prediction of views P1 for a video, or other media clip, as predicted by ML 414.

At step 416 a channel dataset that includes structured data S2, unstructured data US2 is processed to yield a machine learning model that predicts clicks P2, the target variable. One of the features provided among the structured data S1 is views prediction P1, produced by ML 414. Another feature provided is historical click data, the target variable, referred to as Target 2. This may be, for example, the average number of clicks per video on the influencer channel or the number of clicks from a specific video. The result of step 416 processing is a model ML 416 and an estimate or prediction of clicks P2 for a video, or other media clip, as predicted by ML 416.

At step 418 a channel dataset that includes structured data S3, unstructured data US3 is processed to yield a machine learning model that predicts conversions P3, the target variable. One of the features provided among the structured data S3 is clicks prediction P2, produced by ML 416. Another feature provided is historical conversion data, the target variable, referred to as Target 3. This may be, for example, the average number of conversions per video on the influencer channel or the number of conversions from a specific video. The result of step 418 processing is a model ML 418 and an estimate or prediction of conversions P3 for a video, or other media clip, as predicted by ML 418.

Method 410 is used to construct or train models 414, 416, and 418 by feeding historical data and comparing the predicted results to actual results data that has been collected and stored. For example, the model may be executed for thousands of influencer channels. In this example, the data set provided at step 412 relates to a channel being analyzed. Thus, in one example, a dataset, DS, for a channel may be defined as:

DS=Channel metadata (Title, #subscribers, category, total #videos for the channel), Related metadata (Average number of comments/video, average views/video, average clicks/video, average conversions/video), Unstructured data (media clips from the channel, thumbnail images, text comments from posts, etc.)

A simpler formulation of dataset, DS, is:

DS=Structured data (channel metadata, related metadata), Unstructured data (media clips, and other unstructured data collected from the channel)

In operation, the model is first successively executed or trained on each of the 1000 channels until the predictions fall within an acceptable range. Once the model has been trained, the model may be used to analyze a new channel, in which case a data set that includes a new channel, not yet analyzed, is provided and a set of predicted views, clicks, conversions are generated.

In practice, the data sets received and processed at each machine learning step 414, 416, 418 may be nearly identical, with the obvious exceptions that (1) the target variable for each step is different and (2) step 416 receives views prediction P1 from ML 414 and ML 418 receives clicks prediction P2 from ML 416.

Method 410 is uniquely suited to generate predictions of variables that are hierarchically related. The hierarchic relationship in model 400 is due to the fact that a fraction of viewers of a media clip will click and a fraction of those that click with convert, i.e. purchase or accept an offer for a product or service. In model 400, there are three levels of hierarchy, with views being the broadest and highest level, clicks the next broad, and conversions the narrowest and least broad. Each successive lower level is subordinate to the level above. Method 410 can therefore be generalized to model various types of taxonomies that are used to describe hierarchic relationships.

Thus, ML 414, 416, and 418 are trained to uncover the subtle influences within videos and other types of media that affect a viewer's actions. This approach can be generalized in a variety of ways, including (1) it can be applied to other hierarchic relationships, (2) it can be applied to various types of media including video, text, music, (3) it is not constrained to only three levels, it can be applied when there more than three levels of hierarchic relationship, (4) the relationship is not constrained to hierarchy, other types of semantic relationships between target variables can be modeled, including case relationships, inclusion relationships, meronymic relationships and the like.

Figure 5:
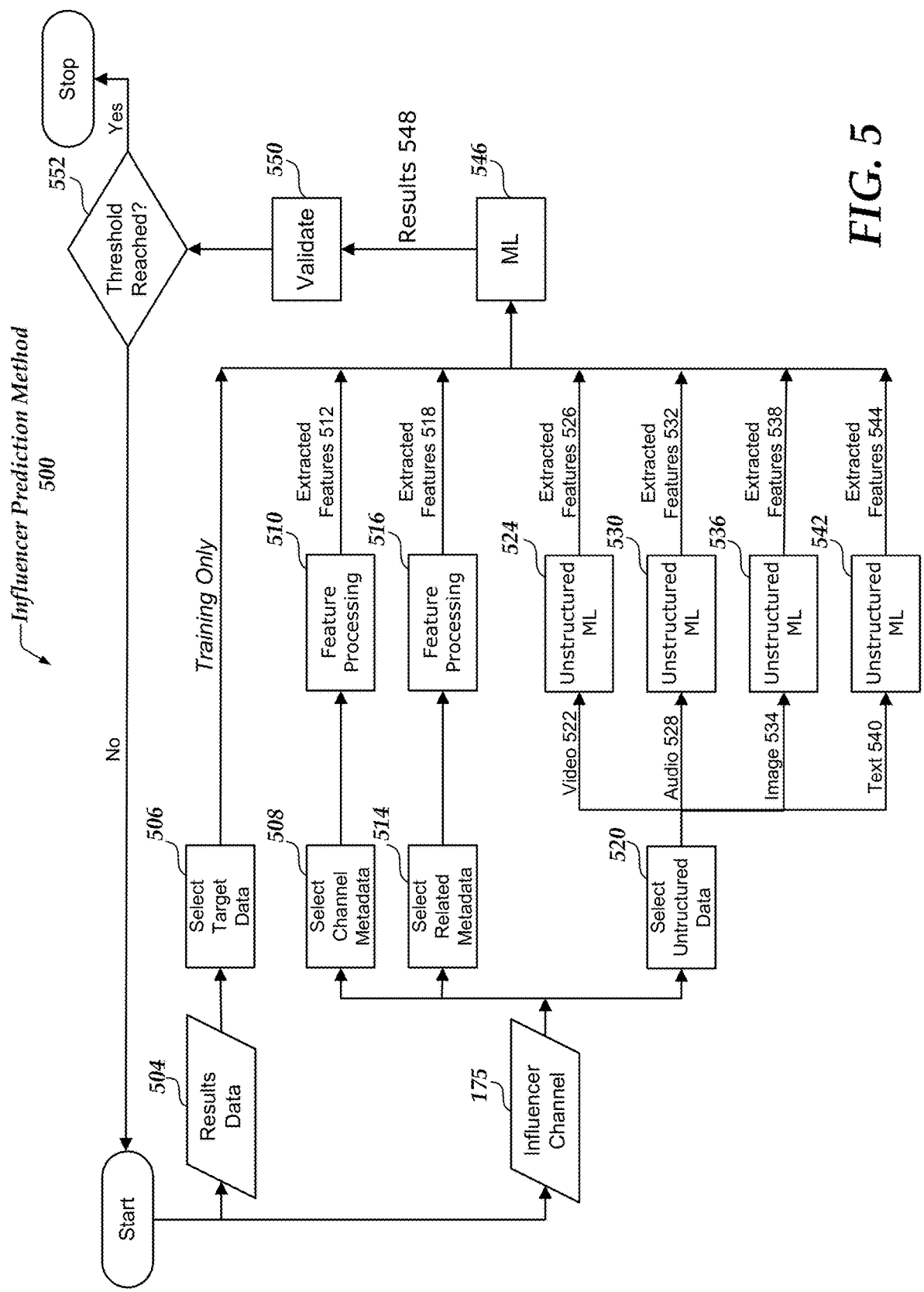
FIG. 5 is an exemplary flow diagram 500 that shows the processing steps performed to train a model to predict the results of placements in an influencer channel.

FIG. 5 is a flow diagram for an exemplary method 500 that trains a model and predicts the results of videos and other media posted to an influencer channel. Method 500 is an embodiment of machine learning steps 414, 416, and 418 of method 400 described hereinabove with reference to FIG. 4.

Operationally, method 500 creates an overall model, at step 546, and validates or tests the model against actual results, referred to as target data or simply a target. Once created and validated, the model is used to predict the results of future videos placements in influencer channel 175. Step 546 represents both machine learning processing and the model that created through successive executions; i.e. in this instance the data and the processing are not separated. While method 500 depicts the machine learning training steps used to generate a highly customized model, the same method is used operationally to evaluate new data and make predictions. The only steps that are omitted during operational use are the validation steps 550-552 and the use of target data 506.

Influencer prediction flow 500 combines influencer campaign results data and influencer channel data from influencer channel 175 and predicts results for future brand or placement campaigns that use channel 175. Data inputs include data harvested from influencer channel 175 and historic results data 506 from previous placement campaigns that used the channel. In certain embodiments, data harvested from channel 175 and results data 504 is stored and managed by content data system 134. In certain embodiments, data from channel 175 is not stored but is harvested in real-time during execution of method 500.

Method 500 combines feature data extracted from structured data inputs with feature data extracted from unstructured data. Thus, feature processing 510 and feature processing 516 process structured data from influencer channel 175, also referred to as metadata, to yield a set of inputs, referred to as extracted features, to an overall machine learning (ML) process 546. In contrast, unstructured data, in the form of video 522, audio 528, image 534 and text 540 is processed by a respective unstructured machine learning (ML) process, referred to as unstructured ML 524, 530, 536 and 542 respectively. In certain embodiments, more than one machine learning approach is used by Unstructured ML 524, 530, 536 and 542. In another embodiment, each of Unstructured ML 524, 530, 536 and 542 uses the same machine learning technology. For example, convolutional neural networks or another machine learning technique that is specially adapted to processing unstructured data may be used. In contrast, ML 546 typically uses a statistical machine learning technique such as regression, decision trees, Bayesian networks, Random Forest and the like to analyze structured data.

Method 500 uses historic results data 504 to help train a model at step 546. Results data is collected during the course of previously executed placement campaigns. Results data is used to train a model at step 546. A target data set 506 is selected from results data 504 and used during the training phase to validate a model. As described with reference to FIG. 4B, target data 506 may include historical views, clicks, and conversion data. Once trained and validated against target data 506, at step 550, the model is validated and is subsequently available to predict future results. Results data 506 is typically not used during operational use.

Domain knowledge is typically applied during the training phase to generate a fully trained model, represented by ML 546. Generally, if the results after a training run are not satisfactory then more cogent input data sets may be selected at steps 508, 514 and 520, as suggested by features identified by ML 546.

Influencer channel 175 data is harvested to initiate training and model execution. Data harvested from includes channel metadata, related metadata and unstructured data. Examples of each type of data are given in Table 3 hereinabove. Channel metadata includes data pertaining to channel 175 itself; related metadata typically is information related to the media clips posted on channel 175; and unstructured data includes media clips, typically audio, image and text harvested from channel 175. It may be appreciated that related metadata is not confined only to data harvested from channel 175; for example, it may come from an influencer's INSTAGRAM or other social network account. Similarly, unstructured data may include media files that are posted on other social networks or other locations on the Internet.

At step 508 channel metadata is selected for processing. In certain embodiments, a human domain expert selects from the various types of data available those data sets that he/she feels are likely to be influential. For example, the number of followers of channel 175, demographic information about the followers, and the gender of the influencer may be included in the data selected in this step. In certain embodiments, during the training phase, the input data is carefully curated by human domain experts to identify input features that optimize the results.

Similarly, at step 514 related metadata is selected. This is typically metadata that corresponds to media clips posted to and available on channel 175. For example, metadata that corresponds to the last 10 videos posted to influencer channel 175 may be selected in this step. Typically, metadata from a number of placement videos are also included. Placement videos are those videos that include placements by a brand and are therefore representative of the types of videos that may be created as a result of a brand campaign using the influencer channel 175 for a future campaign by the brand or by a related brand or for a related product.

At step 510 the channel metadata selected at step 508 is processed to extract features of interest, also referred to as derived metadata. For example, the log of the average number of followers for a channel may be computed and then added to the set of structured metadata selected at step 508, referred to as original metadata. In some cases, the results of step 510 include the metadata provided by step 508, i.e. all the original metadata, plus metadata derived in this step. In other embodiments, this step may yield a combination of original and derived metadata.

At step 516 the related metadata selected at step 514 is processed to generate features of interest, also referred to as derived metadata. For example, the log of the number of likes for a video may be computed and then added to the set of structured metadata selected at step 514, referred to as original metadata. In some cases, the results of step 516 include the metadata provided by step 514, i.e. all the original metadata, plus metadata derived in this step. In other embodiments, step 516 may yield a combination of original and derived metadata.

Generally, the processing performed at steps 510 and 516 are intended to generate features that prove successful in training a machine learning model at step 546. Thus, computing a mean, a standard deviation, and a logarithm are common calculations that may be performed in these steps.

At step 520, unstructured data is selected. This typically includes unstructured data in the form of video 522, audio 528, image 534 and text from the media clips that corresponds to the related metadata selected in step 514.

At steps 524, 530, 536, 542, the respective metadata selected at step 520 is processed using a machine learning technique to extract features of interest. Essentially, at this step the unstructured data is processed to become structured data, typically in the form of a set of features. Each feature includes a label and a per-observation value that indicates the strength of the feature for each observation.

At step 546, extracted features 512, 518, 526, 532, 538, and 544 are used as input to a machine learning process. Machine learning process (ML) 546 generates a model and a set of predictions or results 548. Examples of results 548 are described hereinabove with reference to Table 3. The model generated at step 546 also determines a number of features. Typically, each feature has an importance or weight associated which indicates its relative importance to the result being generated. An example set of features and their associated weights are described hereinbelow with reference to FIG. 7.

ML 546 yields a set of weights, one for each input feature, and a prediction of one or more results.

Each feature typically represents the contribution of either unstructured input data or structured input data. Further, features that represent structured input data will typically represent either channel data or related data and correspond to a numeric or categorical datatype. Features that represent unstructured input data, such as video, audio, image or text, etc, are generated by 524, 530, 536, 542. These unstructured input data features also correspond to numeric or categorical datatype.

During the training phase, observations with features represented by 506, 512, 518, 526, 532, 538, 544 will be split into two datasets: train and predict. The train dataset will be used to train ML method 546. After successful training of 546, the predict dataset, excluding targets 506, will be fed into the now-trained 546. The ML prediction results, 548, are passed into validator method 550, alongside the predict dataset targets, 506. The validator method produces values used to score the quality of the prediction. At step 552 if the results predicted by the model are not within an acceptable margin, then model flows back to the start. During subsequent runs, the selection of data inputs, performed at steps 508, 514, and 520 may be adjusted by a domain expert to improve the results.

At step 552, if the threshold is achieved then training is halted. The model created at step 546 can then be used to predict results of potential placement videos by the influencer on channel 175.

In certain embodiments, convolutional neural networks (CNNs). CNNs, a type of neural network, are used to implement unstructured machine learning steps 524, 530, 536, 542. A CNN is made up of layers of interconnected neurons that have learnable weights and biases. Each neuron receives some inputs and performs a calculation, typically a dot product. The entire network acts to extract features from unstructured data. The CNN is trained through successive executions of method 500 to generate an influencer score that predicts the ability of an influencer to effect conversions by his or her subscribers.

CNNs typically make the assumption that the input data are images. The CNN used in this case is customized to also operate on video or audio input. Whereas the neurons within a layer neural nets are typically fully connected, layers of a CNN are typically divided into smaller rectangles which are interconnected. This reflects the properties of unstructured data such as images, videos and audio.

Because ML 546 generates features and weights that correspond to input data types, domain experts or automated processes can study the output feature data and tune the appropriate input data sets selected for processing at steps 506, 508, 514, 520. Thus, after ML 546 executes the first time, weighted features are available to guide the selection of input data. This concept is described further with reference to FIG. 7 hereinbelow.

Figure 6:
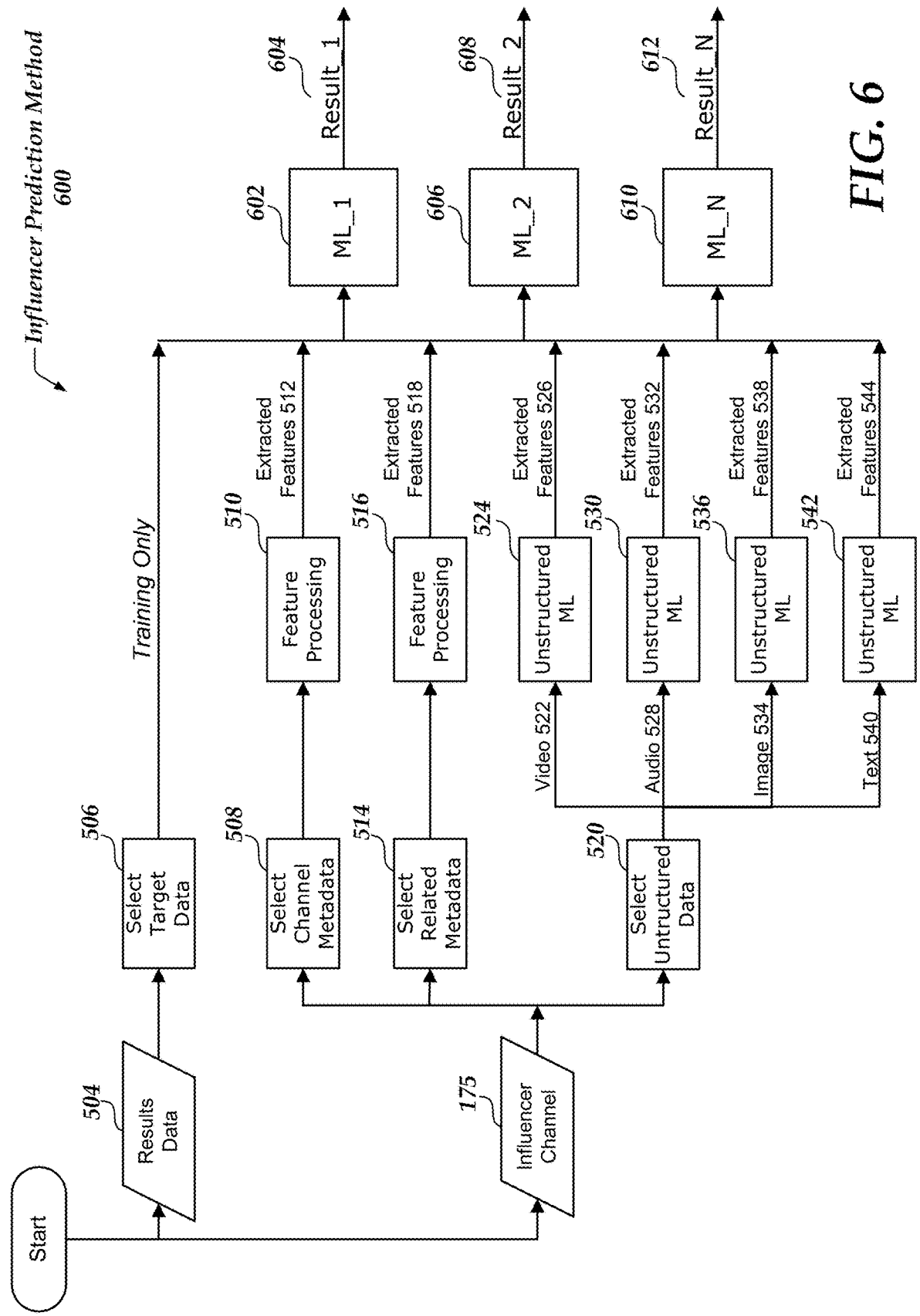
FIG. 6 illustrates an exemplary method for training a plurality of machine learning models to predict results of placements in an influencer channel.

FIG. 6 illustrates an exemplary method 600 for training a plurality of models to predict results of placements in an influencer channel, according to one embodiment. FIG. 6 is identical to method 500 in nearly all respects with the exception that rather than training a single model, at step 546, to predict results, a number of models are trained at steps 602, 606 and 610, each of which is optimized for certain target data. Note that the use of the values 1, 2, N suggests that an arbitrary number of models may be used, where the case of a single model being used is identical to method 500. Although not depicted, during training a validation step that utilizes a threshold value, equivalent to step 550, would be associated with each machine learning step and each target data. The principal difference between method 500 and method 600 is that method 500 attempts to train and then use a single machine learning process and model 546 while method 600 trains custom models for different target data sets and desired results.

There are several practical cases where method 600 may prove advantageous over method 500. A first case where method 600 may prove effective is where each of the models produced, i.e. at steps 602, 606, and 610, are optimized for a different category of product or brand. For example, machine learning process ML_1 602 might be optimized to produce results tailored specifically for shoes whereas process ML_2 604 might be optimized to produce results tailored for automobiles. During training, data sets that include shoe-related videos and metadata would be used to train the model produced by process ML_1 602, whereas datasets that include automobile-related videos and results would be used to train the model produced by process ML_1 602.

A second case where method 600 may prove effective is where each of the models produced, i.e. at steps 602, 606, and 610, are optimized for a different type of result. For example, machine learning process ML_1 602 might be optimized to predict views whereas process ML_2 604 may be optimized to predict conversions. Similar to the first case, the input data sets for process ML_1 602 would include videos that generated a large number of views whereas the input data sets used to train ML_1 602 would focus on successful conversions.

Figure 7:
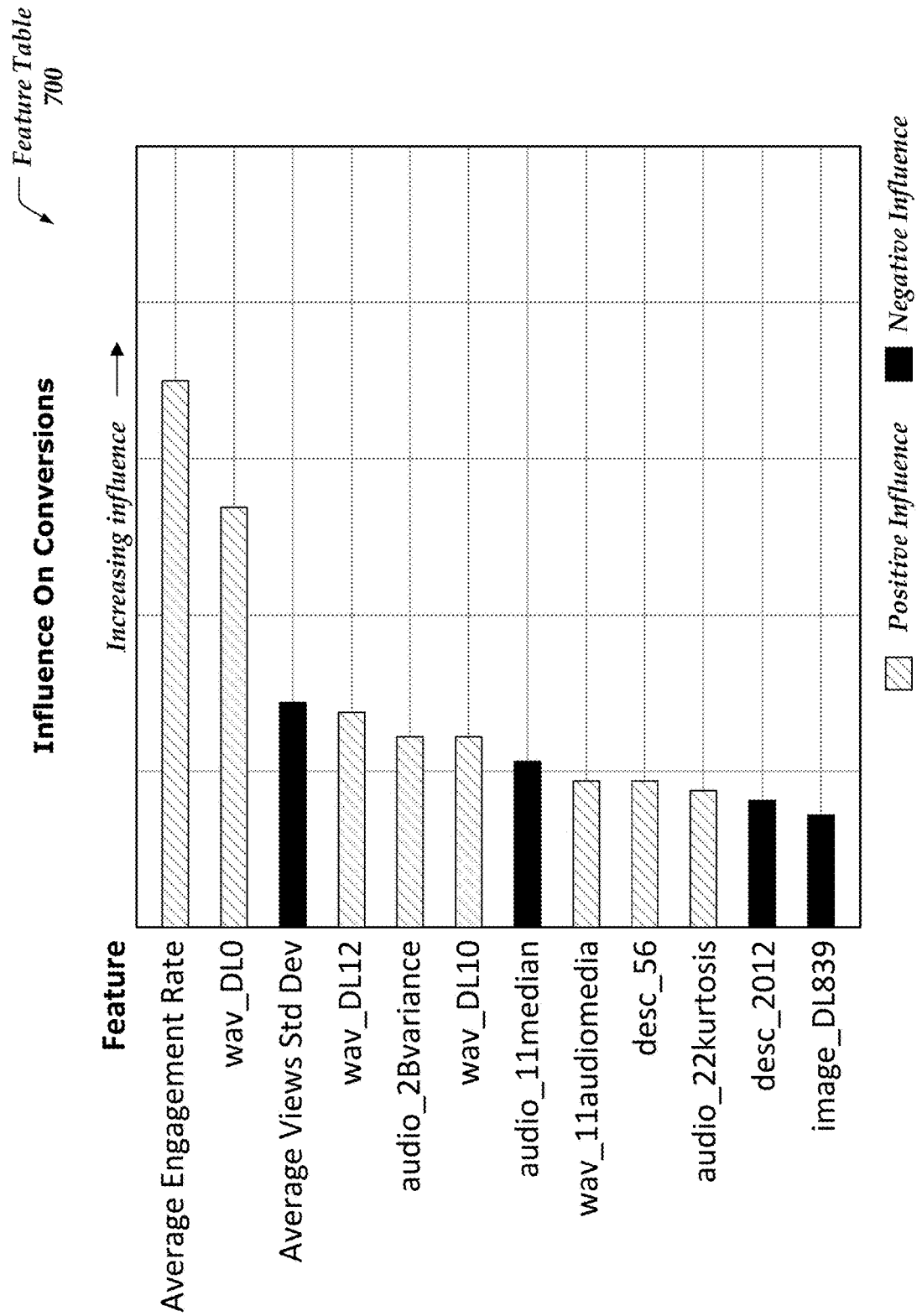
FIG. 7 presents a features table that gives an example of the features and weights generated by a machine learning process.

FIG. 7 presents a feature table 700 that gives an example of the features and weights that are generated by machine learning model 546 that processes feature data derived from both structured and unstructured inputs. In this case, the target variable being evaluated is conversions. Typically, feature table 700 will include hundreds or even thousands of features, along with their weights; thus, the features shown are a selection of typical features generated at step 546 of method 500. As illustrated, a weight can have a positive or negative value, and which corresponds to a positive or negative influence on the target variable being predicted.

The feature data generated at step 546 and illustrated in table 700 is available subsequently for use by human domain experts to select data inputs at steps 508, 514, and 520 of method 500. Features shown in Table 700 include metadata derived by feature processing 510 such as the Average Engagement Rate and the Average Views Standard Deviation. Additional features include wav_DL0, wav_DL2, wav_DL10 which are features that derive from audio tracks, for example from a sound track that may accompany the video. Additional features further include audio_2Bvariance, audio_11median and audio_22kurtosis which are measures of the embedded audio tracks in videos analyzed, which typically reflect aspects of the voice of the influencer. It may be appreciated that derived features, especially those that are derived from unstructured data, may not necessarily have a simple description and may reflect a variety of factors, such as sound variance, pitch, and quality. While it is clear that these features, when present, contribute substantially to a viewer's behavior relative to a given media item it is also clear that without machine learning these features would not have been detected. For example, the feature wav_DL0 makes the second largest contribution towards increasing the influence in relation to the target variable, conversions. wav_DL0 has not clearcut description or explanation but method 500 when suitably trained is capable of detecting its presence in the input dataset and can determine the magnitude of its influence on a target variable.

Feature data obtained at step 546 may be used to guide selection of structured data inputs at step 508 and 514, or it may be used to define new feature processing at steps 510 and 516 that will result in new or different extracted features 512 and 518.

As an example, table 700 identifies average engagement rate as the largest single contributor to influencing a viewer's decision to convert, i.e. to purchase or accept an offer. In this case, average engagement rate is a derived feature. Average Engagement Rate is a blended metric, defined by human domain experts, that averages the number of likes, dislikes and comments for the 10 previous videos posted in an influencer channel. In a subsequent execution of the model, a second measure of engagement rate was created and tested. The metric, referred to as "positive engagement rate" metric averaged only the number of likes and comments for the 10 previous videos posted, i.e. dislikes were omitted. Thus, a subsequent execution of the model often defines and tests new derived structured data features in an effort to obtain the best possible results.

Figure 8:
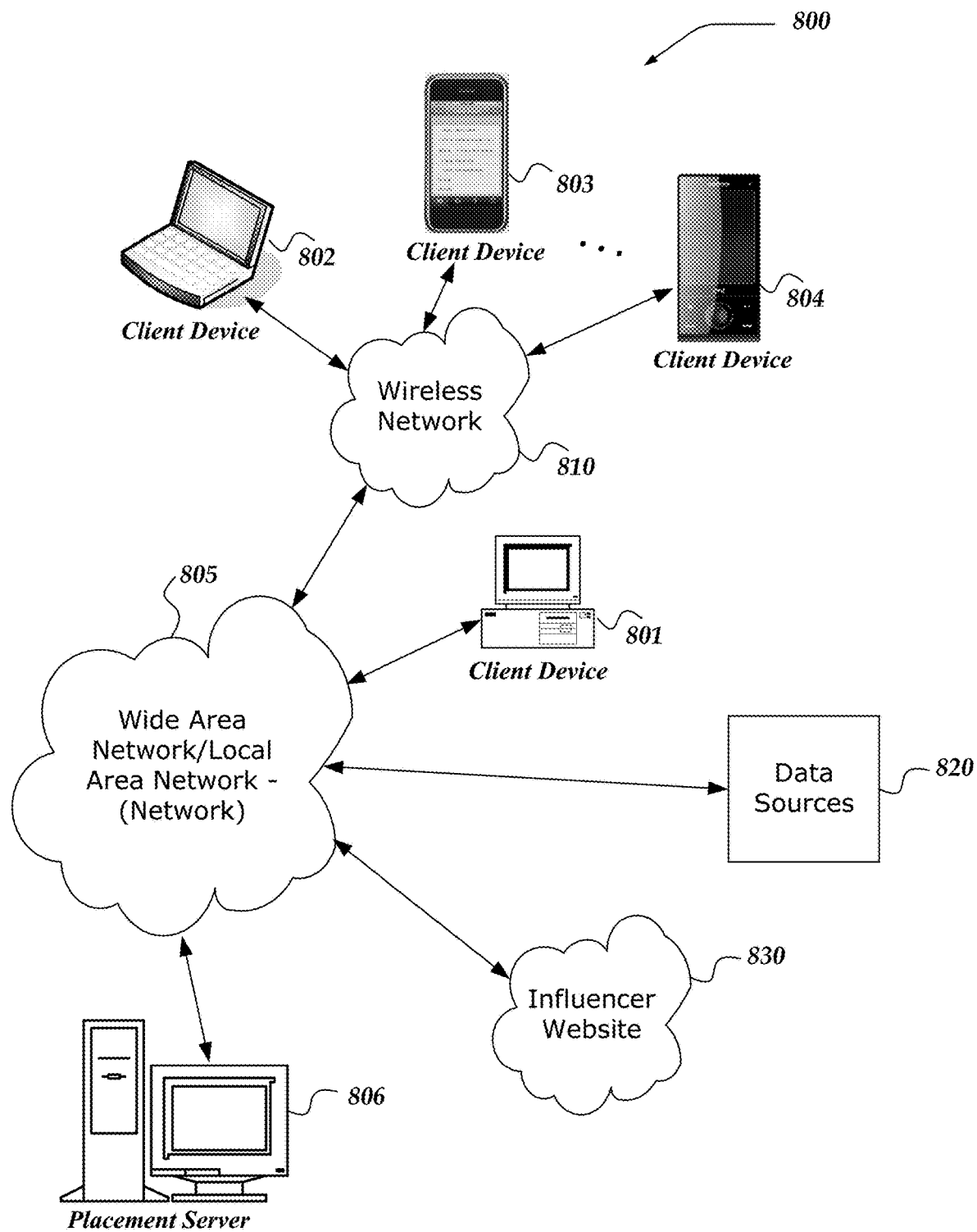
FIG. 8 is a system diagram that shows components of one exemplary environment in which the invention may be practiced.

FIG. 8 is a system diagram that shows components of one exemplary environment in which the invention may be practiced. Not all of the components may be required to practice the invention, and variations in the arrangement and types of the components may be made without departing from the spirit or scope of the invention. As shown, system 800 of FIG. 8 includes wide area network ("WAN")/local area network ("LAN")-(network) 805, wireless network 810, client devices 801-804, an influencer website 830 and a placement server 806.

Buyer computer 110, management computer 120, and viewer computer 160 are embodiments of client devices 801-804 which may connect to either or both of wireless network 810 or network 805. Network 150 is an embodiment of wireless network 810, network 805, or a combination of both. Placement server 806 shows one embodiment, or implementation, of placement service 130. Further, data sources 140 are one embodiment of data sources 820. Influencer website 830 is one embodiment of influencer website 170.

Influencer website 830 provides one or more influencer channels 175. The architecture of influencer website is outside the scope of the present invention. It may be provided by a variety of technologies including computer servers and cloud services.

Generally, client devices 801-804 include any computing devices capable of receiving and sending messages over a network, such as network 805 or wireless network 810. Client devices 801-804 include personal computers, multi-processor systems, microprocessor-based or programmable consumer electronics, mobile devices such as mobile telephones, smart phones, display pagers, tablet computers, handheld computers, laptop computers, wearable computers, or the like.

A Web-enabled client device can communicate across the Web. It may include a browser application that is configured to receive and to send web pages, web-based messages, or the like. The browser application may send, receive and display graphics, text, multimedia, or the like, employing a network protocol such as Hypertext Transfer Protocol (HTTP), HTTP over SSL (HTTPS), and/or wireless application protocol (WAP). Note that the term HTTP/S is used subsequently to refer to either of HTTP or HTTPS.

Client devices 801-804 may include client application programs that send and receive content to/from other computing devices. Examples of application programs include calendars, browsers, and email clients and so forth. Client devices 801-804 may be configured to include an application program that enables a buyer to specify, edit and review a media plan and to view results from a corresponding placement campaign in cooperation with placement server 806. Client devices 801-804 may also be configured to include other application programs used by a media buyer, or management personnel.

Wireless network 810 is configured to couple client devices 802-804 with network 805. Wireless network 910 may include any of a variety of wireless networks that provide a connection for client devices 802-804. Such networks may include mesh networks, wireless LAN (WLAN) networks, cellular networks, or the like. Wireless network 910 may further include network devices such as gateways routers, or the like. In essence, wireless network 910 may include virtually any wireless communication device or mechanism by which enables information to travel between client devices 802-804 and another computing device, network, or the like.

Network 805 is configured to couple placement server 806, and client device 801 with other computing devices, including through wireless network 810 to client devices 802-804. Network 805 may include the Internet in addition to local area networks (LANs), wide area networks (WANs), direct connections, combinations thereof or the like.

Placement server 806 represents one or more network computing devices that are configured to enable a media buyer to interactively specify a media plan, to execute a placement campaign based on the media plan, and to generate results and provide the results to client devices 801-804 for review by the buyer. Placement server 806 is one embodiment of a network device that implements placement service 130.

Devices that may operate as placement server 806 include, but are not limited to personal computers, desktop computers, multiprocessor systems, microprocessor-based or programmable consumer electronics, network PCs, servers, network appliances, and the like.

Although placement server 806 is illustrated as a distinct network device, the invention is not so limited. For example, a plurality of network devices may be configured to perform the functions of placement server 806. One such configuration is a "server farm" that includes multiple server computers operating cooperatively, each performing some of placement server 806 server functions. One embodiment of the software modules that perform placement server 806 server functions is described with reference to FIG. 8 below.

Placement server 806 functions may also be provided by a cloud computing facility, or cloud service, in which the services, features and functions ascribed herein to placement server 806 are delivered as a service over a network, such as the Internet, rather than by a specific server or cluster of servers. Examples of commercial cloud services are AMAZON AWS, MICROSOFT AZURE, and GOOGLE CLOUD.

Placement server 806 is capable of running application programs ("applications"). Applications that may be run by placement server 806 include transcoders, database programs, customizable user programs, security applications, encryption programs, VPN programs, web servers, applications servers, account management systems, and so forth. Applications run by placement server 806 may also include a buyer interface, a management interface, a database manager, and other applications and processes such as those described below in conjunction with FIG. 9.

Placement server 806 provides web services which include any of a variety of network services that are configured to provide content, including messages, over a network to another computing device. Thus, web services may include an application server, a web server, a messaging server, a File Transfer Protocol (FTP) server, a database server, a content server, or the like. Web services may provide the content including messages over the network using any of a variety of formats, including, but not limited to WAP, HDML, WML, SGML, HTML, XML, cHTML, xHTML, JSON, REST, SOAP or the like. Web services may also include server-side scripting languages such as PHP, Python, and Java servlets. Web services may also include the server side of the Ajax web development method that enables a server to asynchronously respond to Ajax requests.

Placement server 806 includes a computer processor (CPU) and nonvolatile data storage for storing program code and data. Data storage may include virtually any mechanism usable for storing and managing data, including but not limited to a file, a folder, a document, a web page or an application, such as a database, digital media including digital images and digital video clips, and the like.

Data storage may further include a plurality of different data stores. For example, data storage may represent an opportunity database, a user database and other databases such as those described below in conjunction with FIG. 9. Further, data storage may also include network storage or cloud storage in which the physical storage media is accessed across a network.

Data sources 820 are accessed across network 805/810 from placement server 806. Typically, data sources 820 is accessed using Web services as previously described. Additionally, data sources 820 may provide data through a cloud storage facility that is accessed using protocols such as HTTP/S and FTP.

Figure 9:
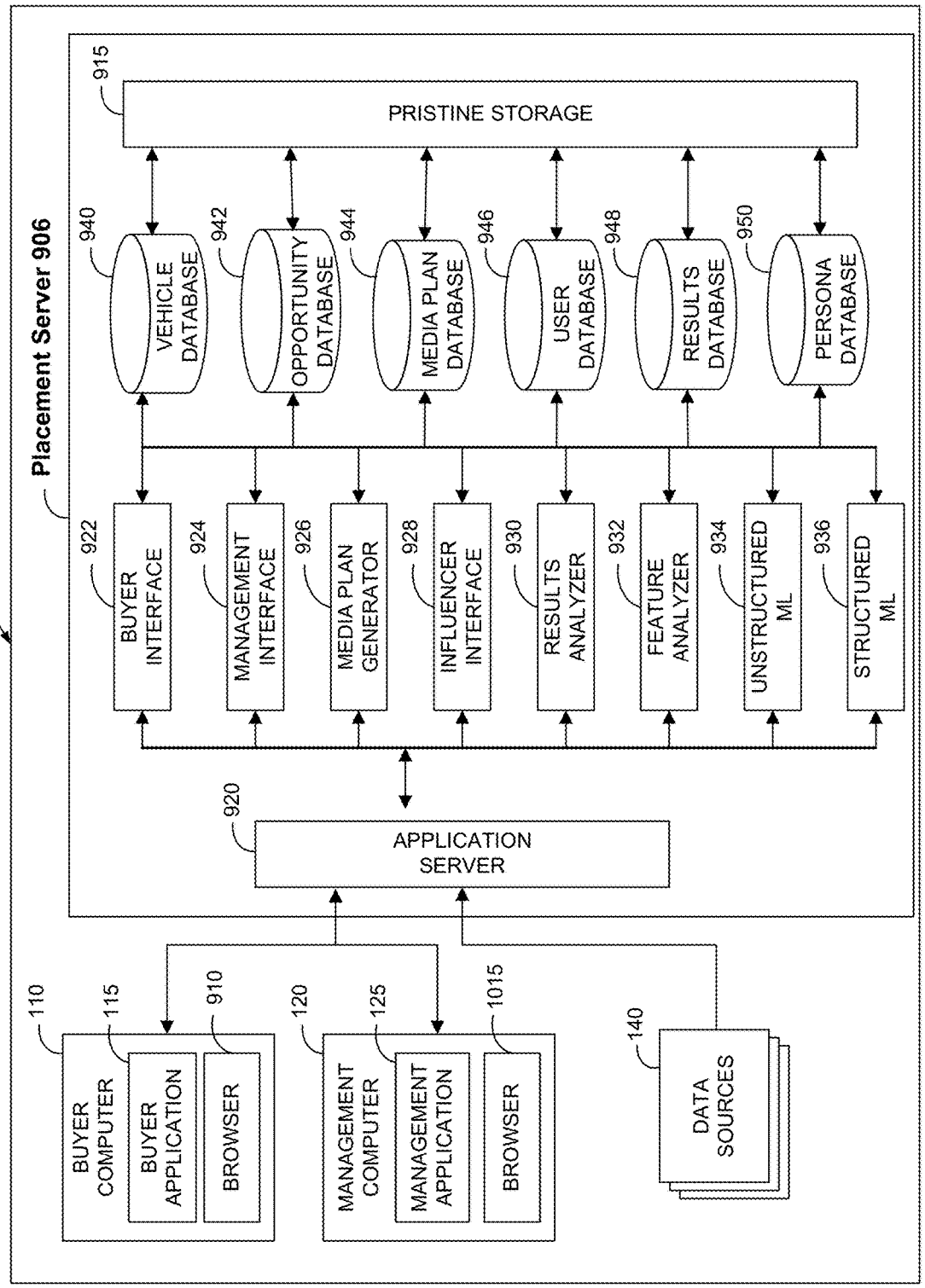
FIG. 9 is block diagram of exemplary software modules of a product placement server that includes a plurality of machine learning processes.

FIG. 9 is block diagram of the exemplary software modules of buyer computer 110, management computer 120 and placement server 806.

As discussed above with reference to FIG. 1, a buyer interacts with buyer computer 110 via buyer application 115. In a preferred embodiment, buyer application 115 is a Web application, which is written using standard Web programming languages such as HTML, JAVASCRIPT, and JAVA, and is executed by a browser 910 that runs on buyer computer 110.

Browser 910 is typically a standard, commercially available, browser such as MOZILLA FIREFOX, MICROSOFT INTERNET EXPLORER, or GOOGLE CHROME. Alternatively, it may also be a client application configured to receive and display graphics, text, multimedia, and the like, across a network.

In one embodiment, when a buyer interacts with placement service 130 using buyer application 115, placement service 130 downloads web pages in HTML format to browser 910 for viewing and interactive use. To perform some of the advanced client-side interactive functions the web pages may include client-side scripting instructions from a client-side scripting language. Typically, such client-side scripting instructions are embedded in HTML web pages and are interpreted or executed by a client-side scripting engine to perform functions not available through HTML commands such as advanced graphics, database access, and computations.

Examples of client-side scripting languages include JAVASCRIPT® from ORACLE CORPORATION of Redwood Shores, Calif., the Java open source programming language, ACTIVEX® from the MICROSOFT CORPORATION of Redmond, Wash.

In one embodiment, browser 910 issues HTTP/S requests to and receives HTTP/S responses from an application server 920 running in placement service 130.

Application server 920 receives the HTTP/S requests and invokes the appropriate placement server 906 service to process the request. Application server 920 may be a commercially available application server that includes a web server that accepts and processes HTTP/S requests transmits HTTP/S responses back along with optional data contents, which may be web pages such as HTML documents and linked objects (images, or the like). In addition, browser 910 may use Ajax to issue requests for XML or JSON-coded information that is delivered asynchronously by application server 920. Henceforth, the term request message will refer to a message sent by browser 910 using HTTP/S, Ajax or other client-server communications method to placement server 906. And a response message will refer to a message sent in response, typically using the same communications method, by application server 920 running in placement server 906.

Application server 920 establishes and manages buyer and manager sessions. Typically, application server 920 assigns each session a unique session id. A session lasts from the time a buyer or manager logs in, or accesses placement service 130, until the time the buyer or manager logs out or stops interacting with placement service 130 for a specified period of time. In addition, application server 920 typically manages server applications and provides database connectivity.

Upon request by browser 910, application server 920 downloads to buyer computer 110 or management computer 120 the HTML, JAVASCRIPT and other browser-executable code that make up buyer application 115 or management application 125, respectively.

In one embodiment, placement server 906 includes the following modules: a buyer interface 922, a management interface 924, a media plan generator 926, an influencer interface 928, a results analyzer 930, a feature analyzer 932, an unstructured machine learning process 934 and a structured machine learning process 932. Placement service 130 further includes pristine storage 915 and five operational databases: a vehicle database 940, an opportunity database 942, a media plan database 944, a user database 946, a results database 948 and a persona database 950. It may be appreciated that each of the abovementioned databases may be implemented as one or more computer files spread across one or more physical storage mechanisms. In one embodiment, each of the abovementioned databases is implemented as one or more relational databases and is accessed using the structured query language (SQL). In other embodiments, a non-relational database may be used.

A pristine storage 915 system receives ingested data from data sources 140 and influencer channel 175 and stores the data in normalized formats. In certain embodiments, pristine storage 915 is implemented as a separate server with data storage and a processor. In other embodiments, pristine storage 915 is implemented as a third-party cloud service, such as AMAZON AWS or MICROSOFT AZURE, which are accessible across a network.

Buyer interface 922, management interface 924, media plan generator 926, influencer interface 928, results analyzer 930, feature analyzer 932, unstructured machine learning process 934 and structured machine learning process 936 may each include, or may share the use of, a commercial database management system (DBMS) to access and search for data and objects that reside in the database. In certain embodiments, the DBMS is a relational DBMS (RDBMS) such as POSTGRESQL, an open source database provided by the POSTGRESQL GLOBAL DEVELOPMENT GROUP, ORACLE® from the Oracle Corporation, SQL SERVER from the Microsoft Corporation, or the like. In other embodiments, a non-relational database, such as MONGODB, may be used.

Buyer interface 922 responds to requests from buyer application 115, i.e. it performs the back-end server processing. Buyer interface enables a media buyer to log in to placement service 130, interactively create a media plan and view forecasts and results from the corresponding placement campaign. Buyer interface 922 provides buyer interface screens and data elements to buyer computer 110 and receives data from buyer computer 110. In one embodiment, upon request, management interface 924 transmits web pages, scripts and other elements used by buyer application 115 to interactively display buyer interfaces to buyer computer 110 for use by buyer application 115.

Management interface 924 responds to requests from management application 125, i.e. it performs the server processing corresponding to the client processing performed by management application 125. Management interface 924 enables staff persons to log in to placement service 130, review, add, edit and delete vehicles, opportunities, media plans, production and placement details, and buyer records stored in a user database. In one embodiment, upon request management interface 924 transmits web pages, scripts and other elements used by management application 125 to interactively display management interfaces to buyer computer 110 for use by management application 125. Management interface 924 further enables human domain experts to interact with influencer prediction methods 500 and 600. Specifically interface 924 enables a manager to specify data inputs and derived features for influencer prediction methods 500 and 600.

Media plan generator 926 generates lists of opportunities, consistent with a media plan, for review, filtering and selection by a media buyer using buyer application 115. Media plan generator 926 stores media plans in media plan database 844.

Influencer interface 928 gathers data from influencer channel 175 and stores it using pristine storage 915 to store influencer channel data.

Results analyzer 930 obtains campaign results data from data sources 140 via pristine storage 915 and generates prices, impressions, and other results data. Results analyzer 930 stores results data in results database 948. Results analyzer 930 relies on pricing engine 932 to perform results forecasts such as price and impressions and to determine media values and, in some embodiments, market values of placements. Results analyzer further obtains results of placements made on influencer channel 175 and generates target data used in method 500 and 600.

Feature analyzer 932 processes unstructured data to yield derived metadata. It performs the functions of feature processing steps 510 and 516 of FIG. 5.

Unstructured machine learning (ML) 934 implements one or more machine learning techniques to process unstructured data. It performs functions of processing steps of Unstructured ML 524, 530, 536 and 542 of FIG. 5.

Structured machine learning (ML) 936 implements one or more machine learning techniques to process structured data. It performs the structured machine learning steps of method 600, namely 602, 604, 610.

In the discussion hereinbelow concerning databases it may be appreciated by one skilled in the art that each database may be implemented as one or more database files, alternatively two or more of the databases may be implemented as a single database file. Further the term database may refer to a relational database file that is accessed by a relational database manager, non-relational database manager, as a B-tree, R-tree, spreadsheet, flat file, comma separated value (CSV), or as any other type of suitable data structure stored within one or more computer files.

Vehicle database 940 stores records for each vehicle in which a placement may be made. The records typically include metadata that describe properties of the vehicle such as the producer or director, artists, owner, and contact information.

Opportunity database 942 stores records for each placement opportunity. The records typically include metadata that describe properties of the opportunity such as the vehicle in which the opportunity occurs, the start and end point, the duration, a description of the scene, which actors are present, and the like. Opportunity records may also store audience fit data relative to specific brand persona.

Media plan database 944 stores records for each media plan prepared or being prepared by a buyer. The records typically include metadata that describe properties of the media plan such as descriptive information provided by the buyer using buyer interface 200, target channel mix, opportunities selected for inclusion and exclusion, filters and other information captured using buyer interfaces 210 and 220, and opportunities to be included in the media plan.

User database 946 stores a record for each buyer, management staff or other user of placement service 130. Each user record includes information such as name and contact information, username and password. Buyer records may include information about buyer preferences.

Results database 948 stores results from placement campaigns, typically generated by results analyzer 930 and pricing engine 932. Results database may include price information such as market rates for conventional advertising, and price tables to be used for forecasting placement prices. Results database 932 may also include historical information and information obtained from data sources 140. Results database 932 further includes target data or results data from placement campaigns that used influencer channel 175. Results database may store other influencer data from influencer channel 175 such as metadata and media clips.

Persona database 950 stores persona created by a management user using a user interface such as buyer interface 220.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for predicting results for a media clip posted to a social media influencer channel, comprising:
    maintaining a database of results data for media clips posted on an influencer channel, wherein an influencer channel includes (1) a plurality of media clips that can be viewed by a viewer using a viewer device, each media clip comprising unstructured data, (2) structured data that describes the influencer channel and provides information about the media clips;
    providing to a first machine learning model a first set of channel data, comprising (1) unstructured data in the form of a media clip, (2) a first selection of the structured data, and (3) historic results for a first target variable;
    extracting a first set of features from the unstructured data and from the first selection of structured data;
    predicting, based on the first set of extracted features, a value for the first target variable;
    providing to a second machine learning model a second set of channel data, comprising (1) the media clip, (2) a second selection of structured data, the second selection including historic results data for a second target variable, and (3) the predicted value of the first target variable;
    extracting a second set of features from the unstructured data and from the second selection of structured data; and
    predicting, based on the second set of extracted features and the predicted value of the first target variable, a value for the second target variable.

2. The method of claim 1 wherein a viewers can view the media clip and can respond to an offer embedded in the media clips by clicking, and wherein the first target variable is the total number of views of the media item by viewers and the second target variable is the total number clicks on the media item by viewers.

3. The method of claim 1 wherein the second target variable is hierarchically related to the first target variable such that the second target variable is subordinate to the first target variable.

4. The method of claim 1 further comprising:
    training the first machine learning model by executing the model sequentially using historic data until the predicted value for the first target variable is within a threshold value of the historic results data for the second target variable; and
    training the second machine learning model by executing the model sequentially using historic data until the predicted value for the second target variable is within a threshold value of the historic results data for the second target variable.

5. The method of claim 1 further comprising:
    providing to a third machine learning model a third set of channel data, comprising (1) the media clip, (2) a third selection of structured data, the third selection including historic results for a third target variable, and (4) the predicted value of the second target variable;
    extracting a third set of features from the unstructured data and from the second selection of structured data; and
    predicting, based on the third set of extracted features and the predicted value of the second target variable, a value for the third target variable.

6. The method of claim 5 wherein upon clicking a viewer can convert by accepting or purchasing a corresponding offer for a product or service and wherein the third target variable is the number of conversions.

7. The method of claim 5 wherein the third target variable is hierarchically related to the second target variable such that the third target variable is subordinate to the second target variable.

8. The method of claim 1 wherein the selected media clip is selected from the group consisting of a video clip, an audio clip, and an image.

9. The method of claim 1 wherein extracting features from a selection of structured data comprises performing a calculation on at least one item of the selection, the calculation selected from the group consisting of a mean, a standard deviation, and a logarithm, a standard deviation, and a mean.

10. The method of claim 1 wherein extracting a set of features from the unstructured data comprises training and executing a deep learning model.

11. The method of claim 10 wherein the deep learning model is selected from the group consisting of convolutional neural networks (CNNs), support vector machines (SVM), recurrent neural networks (RNN), and deep residual networks.

12. The method of claim 1 wherein each of the first machine learning model and the second machine learning model comprise a structured data machine learning technique.

13. The method of claim 12 wherein the structured machine learning technique is selected from the group consisting of regression, decision trees, Bayesian networks, and Random Forest.

14. The method of claim 1 wherein a measure of success for the influencer channel is computed, the measure selected from the group consisting of click through rate, conversions, engagement rate, and views per conversion.

15. A server computer, comprising:
a processor;
a communication interface in communication with the processor;
a data storage for storing results;
a memory in communication with the processor for storing instructions, which when executed by the processor, cause the server:
to maintain a database of results data for media clips posted on an influencer channel, wherein an influencer channel includes (1) a plurality of media clips that can be viewed by a viewer using a viewer device, each media clip comprising unstructured data, (2) structured data that describes the influencer channel and provides information about the media clips;
to provide to a first machine learning model a first set of channel data, comprising (1) unstructured data in the form of a media clip, (2) a first selection of the structured data, and (3) historic results for a first target variable;
to extract a first set of features from the unstructured data and from the first selection of structured data;
to predict, based on the first set of extracted features, a value for the first target variable;
to provide to a second machine learning model a second set of channel data, comprising (1) the media clip, (2) a second selection of structured data, the second selection including historic results data for a second target variable, and (3) the predicted value of the first target variable;
to extract a second set of features from the unstructured data and from the second selection of structured data; and
to predict, based on the second set of extracted features and the predicted value of the first target variable, a value for the second target variable.

16. The server computer of claim 15 wherein a viewers can view the media clip and can respond to an offer embedded in the media clips by clicking, and wherein the first target variable is the total number of views of the media item by viewers and the second target variable is the total number clicks on the media item by viewers.

17. The server computer of claim 15 wherein the second target variable is hierarchically related to the first target variable such that the second target variable is subordinate to the first target variable.

18. The server computer of claim 15 wherein the instructions, when executed by the processor, further cause the server:
to train the first machine learning model by executing the model sequentially using historic data until the predicted value for the first target variable is within a threshold value of the historic results data for the second target variable; and
to train the second machine learning model by executing the model sequentially using historic data until the predicted value for the second target variable is within a threshold value of the historic results data for the second target variable.

19. The server computer of claim 15 wherein the instructions, when executed by the processor, further cause the server:
to provide to a third machine learning model a third set of channel data, comprising (1) the media clip, (2) a third selection of structured data, the third selection including historic results for a third target variable, and (4) the predicted value of the second target variable;
to extract a third set of features from the unstructured data and from the second selection of structured data; and
to predict, based on the third set of extracted features and the predicted value of the second target variable, a value for the third target variable.

20. The server computer of claim 19 wherein upon clicking a viewer can convert by accepting or purchasing a corresponding offer for a product or service and wherein the third target variable is the number of conversions.

21. The server computer of claim 19 wherein the third target variable is hierarchically related to the second target variable such that the third target variable is subordinate to the second target variable.

22. The server computer of claim 15 wherein the selected media clip is selected from the group consisting of a video clip, an audio clip, and an image.

23. The server computer of claim 15 wherein extracting features from a selection of structured data comprises performing a calculation on at least one item of the selection, the calculation selected from the group consisting of a mean, a standard deviation, and a logarithm, a standard deviation, and a mean.

24. The server computer of claim 15 wherein extracting a set of features from the unstructured data comprises training and executing a deep learning model.

25. The server computer of claim 24 wherein the deep learning model is selected from the group consisting of convolutional neural networks (CNNs), support vector machines (SVM), recurrent neural networks (RNN), and deep residual networks.

26. The server computer of claim 15 wherein each of the first machine learning model and the second machine learning model comprise a structured data machine learning technique.

27. The server computer of claim 26 wherein the structured machine learning technique is selected from the group consisting of regression, decision trees, Bayesian networks, and Random Forest.

28. The server computer of claim 15 wherein a measure of success for the influencer channel is computed, the measure selected from the group consisting of click through rate, conversions, engagement rate, and views per conversion.

* * * * *